US010974606B2

(12) United States Patent
Dulle (10) Patent No.: US 10,974,606 B2
(45) Date of Patent: Apr. 13, 2021

(54) BI-STABLE RELAY

(71) Applicant: CPS Technology Holdings LLC, New York, NY (US)

(72) Inventor: Ronald J. Dulle, Mequon, WI (US)

(73) Assignee: CPS Technology Holdings LLC, New York, NY (US)

( * ) Notice: Subject to any disclaimer, the term of this patent is extended or adjusted under 35 U.S.C. 154(b) by 301 days.

(21) Appl. No.: 15/253,181

(22) Filed: Aug. 31, 2016

(65) Prior Publication Data

US 2018/0056806 A1 Mar. 1, 2018

(51) Int. Cl.
| | |
|---|---|
| *B60L 1/00* | (2006.01) |
| *B60L 11/18* | (2006.01) |
| *H02J 7/00* | (2006.01) |
| *B60L 58/10* | (2019.01) |
| *B60L 58/21* | (2019.01) |
| *B60L 50/60* | (2019.01) |
| *B60L 3/04* | (2006.01) |
| *H02J 3/28* | (2006.01) |
| *H02J 9/06* | (2006.01) |

(52) U.S. Cl.
CPC ............ *B60L 11/1864* (2013.01); *B60L 1/00* (2013.01); *B60L 3/04* (2013.01); *B60L 50/60* (2019.02); *B60L 58/10* (2019.02); *B60L 58/21* (2019.02); *H02J 3/28* (2013.01); *H02J 7/0021* (2013.01); *H02J 7/0022* (2013.01); *H02J 7/0026* (2013.01); *H02J 9/061* (2013.01); *H02J 2207/10* (2020.01); *Y02T 10/70* (2013.01)

(58) Field of Classification Search
CPC .......... B60L 1/00; B60L 3/04; B60L 11/1851; H02J 7/0024; H02J 7/0026; H02J 7/0031

USPC ........................................... 307/10, 10.7, 9.1
See application file for complete search history.

(56) References Cited

U.S. PATENT DOCUMENTS

| | | | |
|---|---|---|---|
| 5,562,568 | A | 10/1996 | Smale |
| 5,631,796 | A | 5/1997 | Yoshihara et al. |
| 5,805,054 | A | 9/1998 | Baxter |
| 5,838,136 | A | 11/1998 | Waugh |
| 5,896,057 | A | 4/1999 | Chicca et al. |
| 6,089,533 | A | 7/2000 | Bubeck et al. |

(Continued)

FOREIGN PATENT DOCUMENTS

| | | |
|---|---|---|
| DE | 102009047104 A1 | 5/2011 |
| EP | 745522 | 9/1998 |

(Continued)

OTHER PUBLICATIONS

PCT/US2016/059283 International Search Report and Written Opinion dated Aug. 5, 2017.

*Primary Examiner* — Rexford N Barnie
*Assistant Examiner* — Swarna N Chowdhuri
(74) *Attorney, Agent, or Firm* — Boardman & Clark LLP (57) ABSTRACT

Present embodiments include a control system for one or more battery cells. The control system includes a bi-stable relay configured to switch a state of the bi-stable relay upon receiving a control signal to electrically connect or electrically disconnect the one or more battery cells to a bus and to remain in the state after receiving the control signal. The control system includes a controller configured to be operatively coupled to the bi-stable relay and configured to send the control signal indicative of instructions to control operation of the bi-stable relay based on the state.

19 Claims, 4 Drawing Sheets

(56) References Cited

U.S. PATENT DOCUMENTS

| | | |
|---|---|---|
| 6,310,529 B1 | 10/2001 | Luetzow et al. |
| 7,034,700 B2 | 4/2006 | Kurtz et al. |
| 7,164,983 B2 | 1/2007 | Ruettiger et al. |
| 7,245,474 B2 | 7/2007 | Bolz et al. |
| 7,353,412 B2 | 4/2008 | Spilker |
| 7,511,436 B2 | 3/2009 | Xu |
| 7,984,894 B1 | 7/2011 | Chauza |
| 8,212,421 B2 | 7/2012 | Hoult |
| 8,237,324 B2 | 8/2012 | Pei et al. |
| 8,330,443 B2 | 12/2012 | Ertl et al. |
| 8,540,206 B2 | 9/2013 | Foshansky et al. |
| 8,614,595 B2 | 12/2013 | Acatrinei |
| 9,157,955 B2 | 10/2015 | Hemon et al. |
| 9,283,906 B2 | 3/2016 | Kaltenbrunner |
| 9,292,059 B2 | 3/2016 | Krajci et al. |
| 9,537,328 B2 | 1/2017 | Kim |
| 2004/0036466 A1 | 2/2004 | Berkely |
| 2005/0212491 A1 | 9/2005 | Colombo et al. |
| 2006/0119179 A1 | 6/2006 | Escoda et al. |
| 2007/0267917 A1 | 11/2007 | Puschkat |
| 2011/0267157 A1 | 11/2011 | Kalmbach et al. |
| 2014/0001844 A1 | 1/2014 | Krieg |
| 2014/0159478 A1* | 6/2014 | Ang ............ B60L 1/00 307/9.1 |
| 2014/0347013 A1* | 11/2014 | Kim ............ G01R 31/382 320/134 |
| 2015/0072188 A1 | 3/2015 | Dulle |
| 2015/0183386 A1* | 7/2015 | Tieman ............ H01H 85/46 701/2 |
| 2015/0224948 A1* | 8/2015 | Schoeberl ............ F02N 11/0862 307/10.6 |
| 2015/0258911 A1* | 9/2015 | Sugiyama ............ B60L 50/16 701/22 |
| 2015/0329001 A1* | 11/2015 | Eifert ............ B60L 3/00 320/109 |
| 2016/0089992 A1* | 3/2016 | Le ............ H02J 7/00047 320/107 |
| 2016/0093456 A1* | 3/2016 | Dulle ............ H01H 47/325 307/130 |
| 2016/0094056 A1 | 3/2016 | Dulle |
| 2016/0107635 A1* | 4/2016 | Kodawara ............ B60W 20/00 701/22 |
| 2016/0181783 A1 | 6/2016 | Marquez et al. |
| 2017/0305292 A1* | 10/2017 | Minamiura ............ B60L 58/20 |
| 2018/0009431 A1* | 1/2018 | Akuzawa ............ B60W 10/06 |
| 2018/0334037 A1* | 11/2018 | Masui ............ B60L 58/20 |

FOREIGN PATENT DOCUMENTS

| | | | |
|---|---|---|---|
| EP | 848159 | 7/2002 | |
| EP | 1111751 | 2/2008 | |
| EP | 1542885 | 3/2008 | |
| EP | 1914822 | 7/2010 | |
| EP | 2083498 | 12/2010 | |
| EP | 2314482 | 4/2011 | |
| EP | 2221941 | 11/2012 | |
| EP | 2580085 | 4/2014 | |
| EP | 2308148 | 10/2014 | |
| EP | 2 806 525 A2 | 11/2014 | |
| EP | 2494564 | 1/2015 | |
| EP | 2176938 | 4/2015 | |
| EP | 3043369 | 7/2016 | |
| WO | 1999031696 | 6/1999 | |
| WO | WO-2011064012 A2 * | 6/2011 | ............ H02J 7/0029 |
| WO | WO 2011064012 A2 * | 6/2011 | ............ H01M 10/48 |
| WO | WO-2011064012 A3 * | 8/2012 | ............ H01M 10/48 |
| WO | 2014020582 | 2/2014 | |

* cited by examiner

BI-STABLE RELAY

BACKGROUND

The present disclosure relates generally to the field of batteries and battery modules that use relays to selectively couple the battery to a bus.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

In addition to use in vehicles (e.g., cars, boats, trucks, motorcycles, airplanes), advances in battery technology and rechargeable batteries are more frequently being used it what may be referred to as stationary battery applications. Applications for stationary batteries, which are often used in backup or supplemental power generation, are becoming more widespread with improvements in rechargeable aspects of batteries and with the lowering of prices for such technology. For example, stationary batteries may be utilized for industrial and/or household applications. Such applications may include DC power plants, substations, back-up power generators, transmission distribution, solar power collection, and grid supply.

As technology continues to evolve, there is a need to provide power systems with more efficiency for such vehicles, stationary battery applications or systems, and other battery systems. Power systems may be used in a variety of applications to provide power to a load. For example, battery cells may be stored in a container and coupled to the load. The battery cells are charged to provide a power to the load. The less energy used in providing power to the load, the more efficient the power system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a control system for one or more battery cells includes a bi-stable relay configured to switch a state of the bi-stable relay upon receiving a control signal to electrically connect or electrically disconnect the one or more battery cells to a bus and to remain in the state after receiving the control signal, and a controller configured to be operatively coupled to the bi-stable relay and configured to send the control signal indicative of instructions to control operation of the bi-stable relay based on the state.

In a second embodiment, a non-transitory computer-readable medium includes instructions configured to be executed by a controller operatively coupled to a bi-stable relay on a string between a first side and a second side of a bus, the instructions include instructions to receive, via the controller, power from a primary source, receive, via the controller, power from one or more battery cells on the string, control, via the controller, operation of the bi-stable relay using power from the primary source to electrically connect or electrically disconnect the one or more battery cells, and control, via the controller, operation of the bi-stable relay using power from the one or more battery cells in an event where the primary source does not provide power.

In a third embodiment, a power system includes a first control system of a string of battery cells, the first control system include a first bi-stable relay and a first controller, wherein the first controller is configured to control a first state of the first bi-stable relay using power from the battery cells during an event where a primary source does not provide power to the first controller and to otherwise control the first bi-stable relay using power from the primary source to minimize imbalance caused by drawing power from the battery cells.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

Embodiments of the present disclosure include control systems for strings of battery cells. Battery cells on strings may be selectively coupled to a bus via a relay to provide power to one or more loads on the bus. For example, a mono-stable relay may electrically couple the battery to the bus while the relay receives current. That is, if the mono-stable relay stops receiving current, the relay may open, disconnecting the battery from the bus and electrically isolating the battery from the load.

Because the mono-stable relay receives current while electrically coupled to the bus, the mono-stable relay may use energy to stay in a closed state. Further, many applications may include several battery cells (e.g., 5, 10, 20, 30, or more). For example, a power system may include 32 strings that include cell and two relays each. Each of the 64 relays may use energy while in a closed state which reduces efficiency of the system. That is, power may be used by the relay to maintain the relay in a closed state. Because there may be several relays (e.g., 16, 20, 32, 64, 128, etc.) in each power system and each relay may use a substantial amount of power, the use of mono-stable relays may reduce the efficiency of the system. For example, in a 32 string system, each pair of relays may receive approximately 1 Amps of current at 12 Volts, resulting in the use of 64 Watts to control the operation of the relays. As such, mono-stable relays may use significant energy to provide power to the load and overall efficiency of the system may be reduced. Note that the values used above are simply meant to be illustrative and any suitable numbers of relays may receive any suitable amount of current to operate in various power systems.

Bi-stable relays may reduce the energy lost in controlling the relay by maintaining a state of the bi-stable relay without receiving additional current. That is, a bi-stable relay receives current for a period of time and remains open or closed after the period of time. As such, the bi-stable relay may electrically couple the battery to the one or more loads after the current has stopped flowing due to the bi-stable relay maintaining the state (e.g., open or closed) of the bi-stable relay. For example, a bi-stable relay may connect the battery cell to the bus upon receiving current for 10 milliseconds to enable the battery to provide power to the one or more loads. Then, the bi-stable relay may not continue to receive additional current and maintain a closed state in which the battery provides power to the one or more loads. The bi-stable relay may then receive current for another 10 milliseconds to open the bi-stable relay and electrically decouple the battery from the bus.

To control the state of the bi-stable relay, the bi-stable relay may be operatively coupled to a control system. The control system may include a controller that maintains the state of the bi-stable relay and sends signal(s) to control operation of the bi-stable relay based on the current state and a desired state. For example, in the event of a fault, the controller may send a control signal to the bi-stable relay to cause the bi-stable relay to open to disconnect the battery cells from the bus. That is, the controller may determine whether the bi-stable relay is currently in a closed state. If the controller is in the closed state, the controller may send a control signal (e.g., pulse) instructing the bi-stable relay to open and disconnect the battery cells.

Further, in the event of the fault, the control system may switch the bi-stable relay via power from the battery cell. During operation, the control system and/or the bi-stable relay may be powered from a primary power source to maintain balance within each of the battery cells. The primary power source may be referred to as a low voltage power source having a voltage lower than the battery cell voltage. In the event of a fault (e.g., short circuit) or other event in which the primary source is unavailable, the control system may control operation of the bi-stable relay using power from the battery cells. For example, the control system may send a signal, via power from the battery cells, indicative of instructions to open the bi-stable relay to disconnect the battery cells from the bus while the primary source is unavailable.

Figure 1:
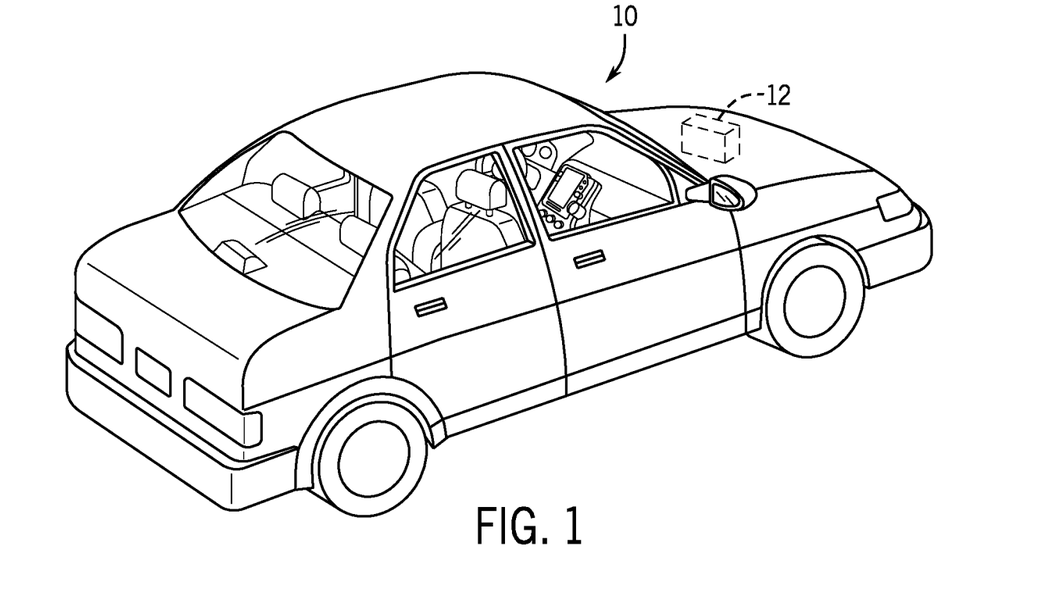
FIG. 1 is perspective view of a vehicle (an xEV) having a battery system contributing all or a portion of the power for the vehicle, in accordance with an embodiment of the present approach.

To help illustrate, FIG. 1 is a perspective view of an embodiment of a vehicle 10, which may utilize a regenerative braking system and features in accordance with present embodiments. Although the following discussion is presented in relation to vehicles with regenerative braking systems, the techniques described herein are adaptable to other vehicles that capture/store electrical energy with a battery, which may include electric-powered and gas-powered vehicles. Further, the techniques described herein may also be adaptable to other high voltage energy storage/expending applications, such as stationary battery systems (e.g., electrical grid power storage systems).

As discussed above, it may be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
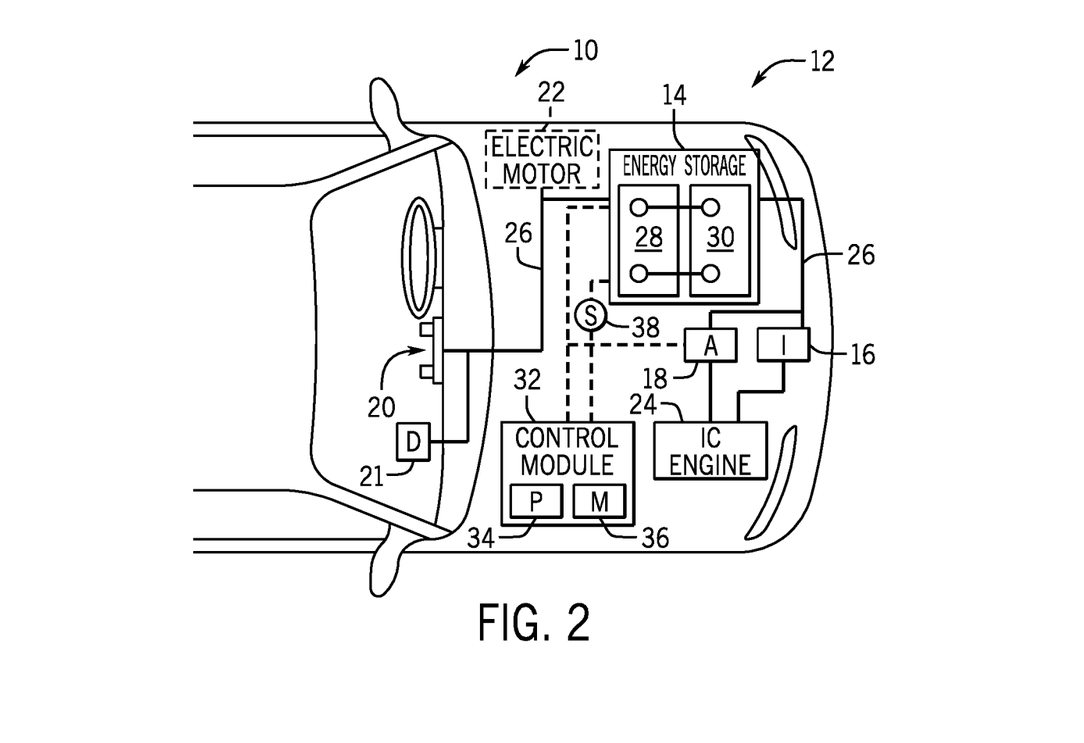
FIG. 2 is a cutaway schematic view of the xEV of FIG. 1 in the form of a hybrid electric vehicle (HEV), in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20, a display 21 within the vehicle, and the ignition system 16, which may be used to start (e.g., crank) an internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8 and 18 volts.

Additionally, as depicted, the energy storage component 14 may include multiple battery modules. For example, in the depicted embodiment, the energy storage component 14 includes a lead acid (e.g., a first) battery module 28 in accordance with present embodiments, and a lithium ion (e.g., a second) battery module 30, where each battery module 28 includes one or more battery cells. In other embodiments, the energy storage component 14 may include any number of battery modules. Additionally, although the first battery module 28 and the second battery module 30 are depicted adjacent to one another, they may be positioned in different areas around the vehicle. For example, the second battery module 30 may be positioned in or about the interior of the vehicle 10 while the first battery module 28 may be positioned under the hood of the vehicle 10.

In some embodiments, the energy storage component 14 may include multiple battery modules to utilize multiple different battery chemistries. For example, the first battery module 28 may utilize a lead-acid battery chemistry and the second battery module 30 may utilize a lithium ion battery chemistry. In such an embodiment, the performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate an amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, determine a predicted temperature trajectory of either battery module 28 or 30, determine predicted life span of either battery module 28 or 30, determine fuel economy contribution by either battery module 28 or 30, control magnitude of voltage or current output by the alternator 18 and/or the electric motor 22, and the like.

Accordingly, the control module 32 may include one or more processors 34 and one or more memories 36. More specifically, the one or more processors 34 may include one or more application specific integrated circuits (ASICs), one or more field programmable gate arrays (FPGAs), one or more general purpose processors, or any combination thereof. Generally, the processor 34 may perform computer-readable instructions related to the processes described herein. Additionally, the processor 34 may be a fixed-point processor or a floating-point processor.

The one or more memories 36 may include volatile memory, such as random access memory (RAM), and/or non-volatile memory, such as read-only memory (ROM), optical drives, hard disc drives, or solid-state drives. In some embodiments, the control module 32 may include portions of a vehicle control unit (VCU) and/or a separate battery control module. Additionally, as depicted, the control module 32 may be included separate from the energy storage component 14, such as a standalone module. In other embodiments, the battery management system 36 may be included within the energy storage component 14.

In certain embodiments, the control module 32 or the processor 34 may receive data from various sensors 38 disposed within and/or around the energy storage component 14. The sensors 38 may include a variety of sensors for measuring current, voltage, temperature, and the like regarding the battery module 28 or 30. After receiving data from the sensors 38, the processor 34 may convert raw data into estimations of parameters of the battery modules 28 and 30. As such, the processor 34 may render the raw data into data that may provide an operator of the vehicle 10 with valuable information pertaining to operations of the battery system 12, and the information pertaining to the operations of the battery system 12 may be displayed on the display 21. The display 21 may display various images generated by device 10, such as a graphical user interface (GUI) for an operating system or image data (including still images and video data). The display 21 may be any suitable type of display, such as a liquid crystal display (LCD), plasma display, or an organic light emitting diode (OLED) display, for example. Additionally, the display 21 may include a touch-sensitive element that may provide inputs to adjust parameters of the control module 32 or data processed by the processor 34.

The energy storage component 14 may have dimensions comparable to those of a typical lead-acid battery to limit modifications to the vehicle 10 design to accommodate the battery system 12. For example, the energy storage component 14 may be of similar dimensions to an H6 battery, which may be approximately 13.9 inches×6.8 inches×7.5 inches. As depicted, the energy storage component 14 may be included within a single continuous housing. In other embodiments, the energy storage component 14 may include multiple housings coupled together (e.g., a first housing including the first battery 28 and a second housing including the second battery 30). In still other embodiments, as mentioned above, the energy storage component 14 may include the first battery module 28 located under the hood of the vehicle 10, and the second battery module 30 may be located within the interior of the vehicle 10.

The energy storage component 14 may be located on a string having a relay. The control module 32 may send a signal to control operation of the relay. In some embodiments, the control module may include a controller that monitors a state of the relay and controls the relay based on the state. As explained below, the controller may send a signal indicative of instructions to open the relay in an event where a primary source is not providing power (e.g. due to a fault, a short, a disconnect, etc.). Further, the controller may temporarily use power from battery cells of the battery modules 28 and 30 to provide the signal.

Figure 3:
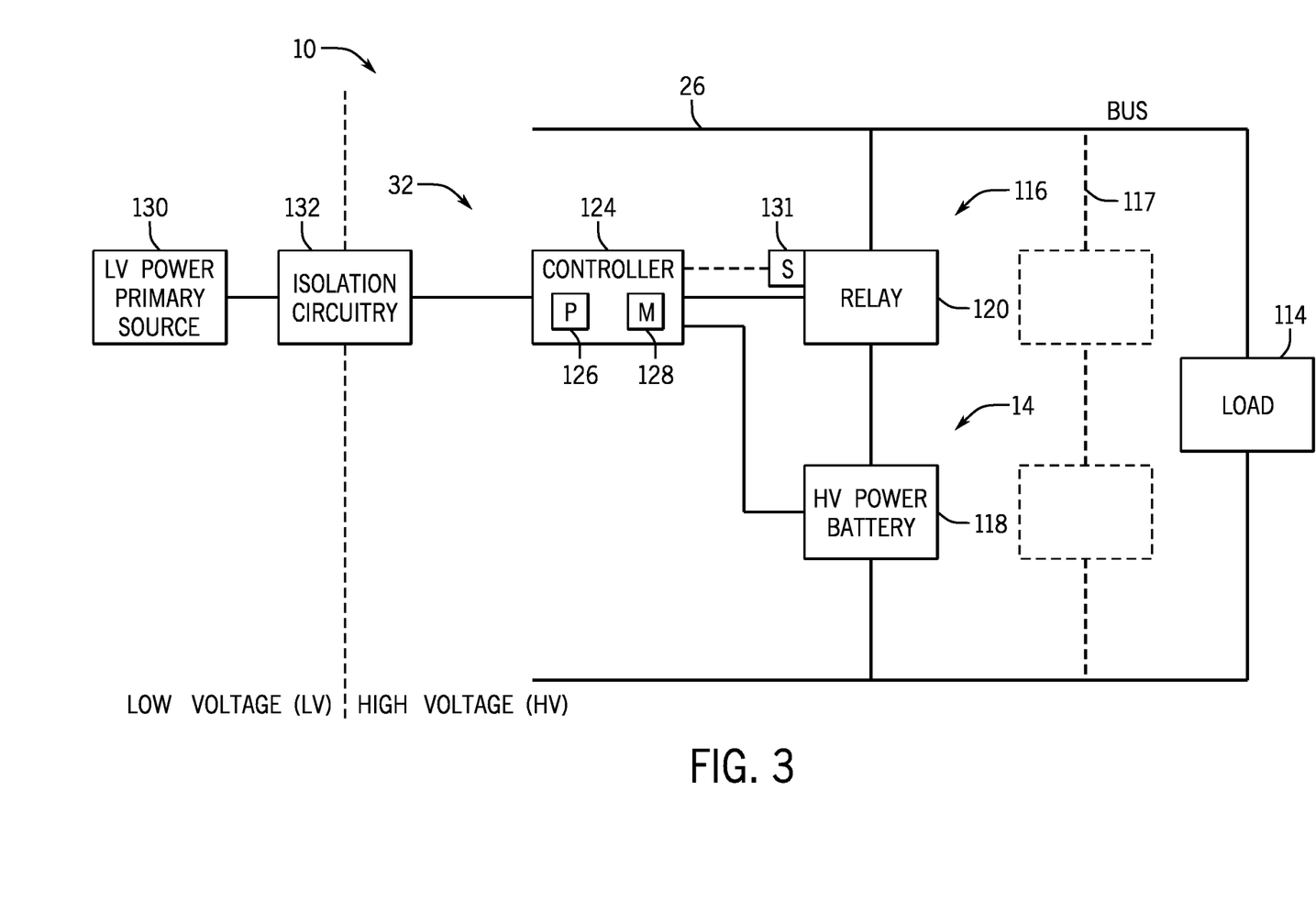
FIG. 3 is a block diagram of a control system of a battery string that controls a relay that couples or decouples the battery from a bus, in accordance with an embodiment of the present approach.

FIG. 3 is an embodiment of a power system, such as the battery system 12 of the vehicle 10, a stationary power system, or the like. The power system includes the energy storage component 14 on the DC bus 26 that provides power to one or more loads 114. The DC bus 26 may include one or more strings 116 that each have one or more battery cells 118. Strings 116 may be referred to as a set of battery cells electrically connected to provide power to a bus. While one string 116 and one battery cell 118 is shown in FIG. 3, this is meant to be illustrative, and any suitable number of strings and battery cells (e.g., battery modules 28 and 30 of FIG. 2) may be used. Additional strings may be added in parallel as indicated by phantom lines 117 to electrically couple the battery cells between the sides of the bus 26. Between the battery cells 118 of the energy storage component 14 and the DC bus 26, the string 116 may include one or more relays, such as a bi-stable relay 120. The bi-stable relay 120 may be an electrically controlled switch that selectively and electrically couples the battery cell 118 to the DC bus 26 depending on a state of the bi-stable relay 120. That is, the bi-stable relay 120 may be in an open state, in which the battery cell 118 is electrically disconnected from the DC bus 26, or in a closed state, in which the battery cell 118 is electrically connected to the DC bus 26 to provide power to the one or more loads 114.

Mono-stable relays may electrically connect the battery cell 118 to the DC bus 26 while the relay receives current. That is, the mono-stable relay may be closed for a period that depends on a duration that the mono-stable relay receives current. Because the mono-stable relay receives current throughout the duration in which the mono-stable relay is closed, the power used to maintain the mono-stable relay in the closed state may reduce the overall efficiency of the power system. As explained above, if the power system includes several strings 116, maintaining the mono-stable relay in the closed state by consistently providing current to the relay consumes a significant amount of power.

The bi-stable relay 120 may improve efficiency of the power system by switching states via a pulse of a voltage, a current, or both. Upon receiving the pulse, the state of the bi-stable relay 120 may be switched from an open state to a closed state or from a closed state to an open state and remain in the state after the pulse. For example, the bi-stable relay 120 may receive current for a duration (e.g., 1 millisecond, 5 milliseconds, 10 milliseconds, 100 milliseconds, etc.), stop receiving current after the duration, change states (e.g., from an open state to a closed state or from a closed state to an open state), and remain in the changed state after receiving the current. As such, the bi-stable relay 120 may electrically couple the battery cell 118 to the DC bus 26 upon receiving a pulse of a voltage, a current, or both, and continue electrically coupling the battery cell 118 to the DC bus 26 after the pulse, thereby reducing the amount of power consumed while the battery cell 118 and the DC bus 26 are electrically coupled.

The control module 32 may be used to control operation of the bi-stable relay 120. The control module 32 may include a controller 124 operatively coupled (e.g., electrically coupled using an electrical conductor that conducts current) to the bi-stable relay 120 (e.g., a gate of the bi-stable relay) to send electrical signal(s) (e.g., voltage or current pulses) to control operation of the bi-stable relay 120. That is, the controller 124 may include circuitry or hardware configured to maintain (e.g., store via memory or monitor via a sensor) the state of the bi-stable relay 120 and to send signal(s) to the bi-stable relay 120 indicative of instructions (e.g., pulses) to switch the state of the bi-stable relay 120 based on the maintained (e.g., current) state of the bi-stable relay. The controller 24 may be a microcontroller, field-programmable gate array (FPGA), application specific integrated circuit (ASIC), or some combination thereof. The controller may include a processor 126, or multiple processors, such as one or more "general-purpose" microprocessors, one or more special-purpose microprocessors, or some combination thereof. For example, the processor 126 may include one or more reduced instruction set (RISC) processors, advanced RISC machine (ARM) processors, performance optimization with enhanced RISC (PowerPC) processors, or any other suitable processing device.

The controller 124 may also include one or more storage devices and/or other suitable components, such as a memory 128, operatively coupled to the processor 126 to execute software, such as software for controlling the bi-stable relay 120, and so forth. The memory 128 may include a volatile memory, such as random access memory (RAM), nonvolatile memory, such as read-only memory (ROM), flash memory, or any combination thereof. The memory 128 may store a variety of information that may be used for various purposes. For example, the memory 128 may store processor-executable instructions (e.g., firmware or software) for the processor 126 to execute, such as instructions for controlling the bi-stable relay 120. The storage device(s) (e.g., nonvolatile storage) may include ROM, flash memory, a hard drive, or any other suitable optical, magnetic, or solid-state storage medium, or a combination thereof. The storage device(s) may store data (e.g., the state of the relay), instructions (e.g., software or firmware for controlling the bi-stable relay 120), and any other suitable data.

The controller 124 may receive power from a primary source 130, such as the electric motor 22, the internal combustion (IC) engine 24, a power grid, or the like. The primary source 130, also referred to as a low voltage (LV) power source, may provide power at a lower voltage than the higher voltage of the battery cell 118. For example, the primary source 130 may provide 12 Volt power to the controller 124 to enable the controller 124 to control the bi-stable relay 120 during operation. Further, the power system may include isolation circuitry 32 that isolates the LV components (e.g., hardware, circuitry, etc.) of the power system from the high voltage (HV) components (e.g., hardware, circuitry, etc.), such as the battery cell 118 and the DC bus 26.

During operation, the controller 124 may control operation of the bi-stable relay 120 via the power received from the primary source 130. The controller 124 may control the state of the bi-stable relay 120. For example, the controller 124 may store in the memory 128 an indication (e.g., open or closed) of the current state of the bi-stable relay 120. In other embodiments, the controller 124 may detect, via a sensor 131 (e.g., voltage sensor, current sensor, etc.), a sensor signal indicative of the current state of the bi-stable relay 120. The controller 124 may then send a control signal indicative of instructions to control the state of the bi-stable relay 120 based on the current state and/or a desired state. For instance, if the bi-stable relay 120 is currently in a closed state, the controller 124 may send a pulse to open the bi-stable relay 120 and update the state in the memory 128 to indicate that the bi-stable relay 120 is open.

Using the battery cells 118 to power the controller 124 regardless of the primary source 130 may increase imbalance in the battery cells 118 (e.g., due to drawing more power from certain cells more than other cells to power the controller 124). Further, if a fault occurs (e.g., on the high voltage side, the low voltage, or both), it may be desirable to control the bi-stable relay 120 while the primary source 30 is unavailable. As such, in an event where the primary source 130 does not provide power to the controller 124, the controller 124 may control the bi-stable relay 120, via power from the battery cell 118, to electrically disconnect the battery cell 118 from the DC bus 26. That is, the controller 124 may control the bi-stable relay 120 via power from the battery cell 118 during the event where the primary source 130 does not provide power (e.g., during a fault, short circuit, or outage), and otherwise control the bi-stable relay 120 via power from the primary source 130 to reduce imbalance caused by drawing power from the battery cell 118. That is, in certain embodiments, the controller may minimize an amount of power drawn from battery cells 118 to control the bi-stable relay 120 and to otherwise control the bi-stable 120 using the primary source 130. In some embodiments, the controller 124 may detect whether the primary source 30 is providing power. The controller 124 may draw power from the battery cell 118 to open the bi-stable relay 120 and to shut down operation of the battery cell 118.

Figure 4:
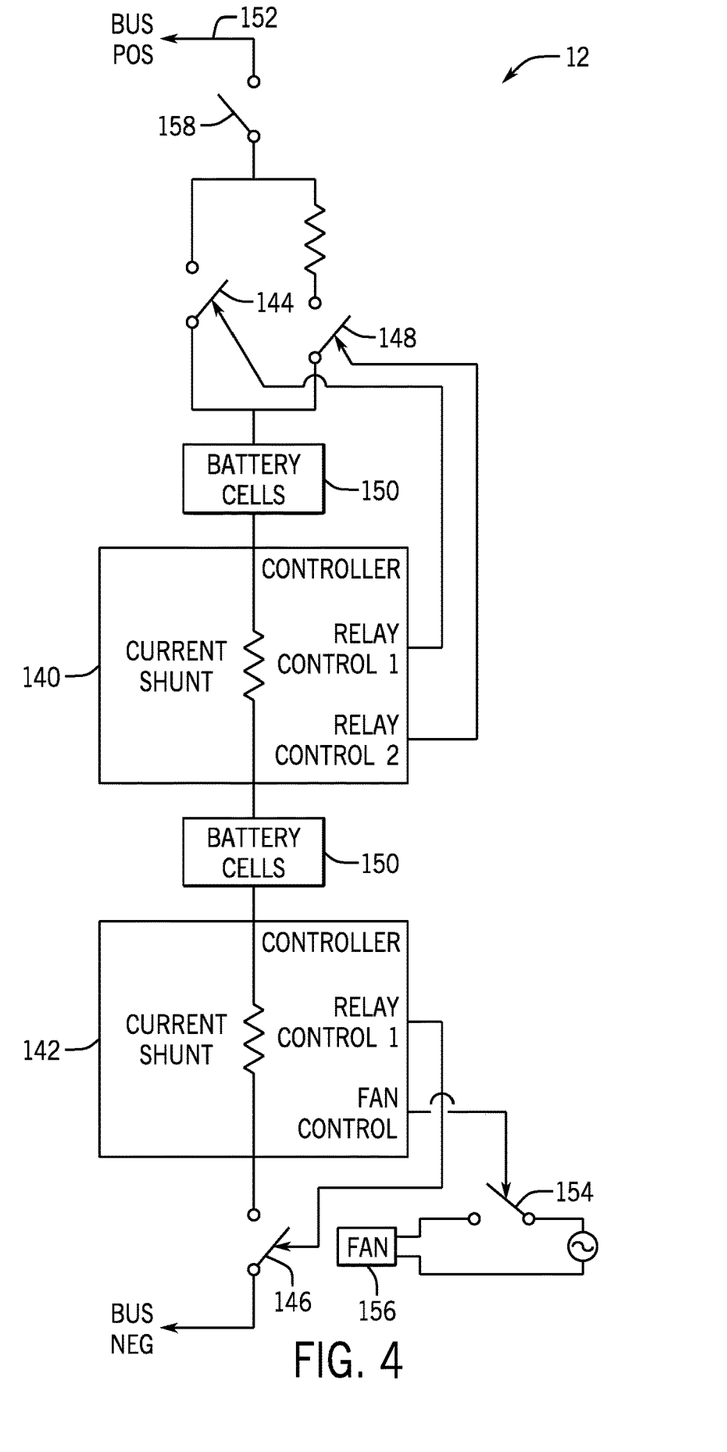
FIG. 4 is a schematic diagram of the relay of the control system of FIG. 3, in accordance with an embodiment of the present approach.

FIG. 4 is a schematic diagram of the battery system 12 of FIG. 3 for a string 138. In the illustrated embodiment, the control module 32 includes controllers 140 and 142. The controllers 140 and 142 may include hardware and/or circuitry similar to those described with respect to the controller 124 of FIG. 3. While two controllers are used, this is meant to be illustrative, and one, two, three, four, or any other suitable number of controllers may be used. The controllers 140 and 142 may each include one or more input/output ports that are programmed to send signal(s) indicative of instructions to control operation of the bi-stable relays 144 and 146, respectively. As described above, the controllers 140 and 142 may store the state of the bi-stable relays 144 and 146 in memory, detect the state of the bi-stable relays 144 and 146 (e.g., via signals from voltage or current sensors on the DC bus 152, the string 138, the bi-stable relay, etc.), or any combination thereof. The controllers 140 and 142 may send control signal(s) to the respective bi-stable relays 144 and 146 to close the relays 144 and 146 to enable the battery cell 150 to provide power to the bus 152. The battery system 12 includes a first bi-stable relay 144 between the battery cell 150 and a first side of the bus 152 and a second bi-stable relay 146 between the battery cell 150 and a second side of the bus 152, opposite the first side, to improve the robustness of the battery system 12.

In the illustrated embodiment, each of the controllers 140 and 142 control an operation in addition to the respective bi-stable relays 144 and 146. The controller 140 is operatively coupled to the bi-stable relay 144 as well as a pre-charge circuit 148 having a resistor to limit the current due to capacitance on the DC bus 152. That is, the controller 140 may send signal(s) to control the pre-charge circuit 148 to reduce an impact on the bi-stable relay 144 from capacitance on the bus 152. As another example, controller 142 is operatively coupled to a relay 154. The controller 142 may send a signal to the relay to open or close the relay to electrically couple an alternating current (AC) source (e.g., a source other than the battery cells 150) to an auxiliary load, such as a fan 156. The string 138 may also include a service disconnect 158 to manually disconnect the battery cells 150 to perform services on the string 138.

Figure 5:
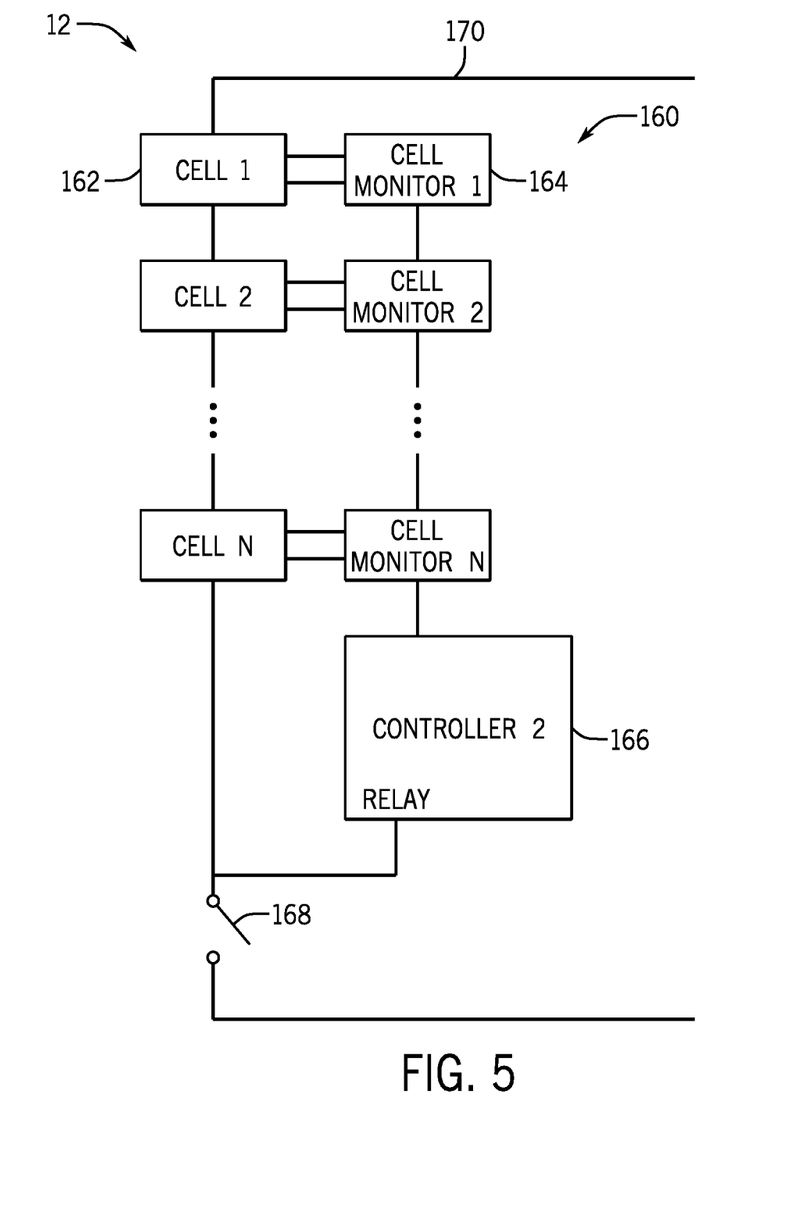
FIG. 5 is a block diagram of the one or more battery cells of the battery string of FIG. 3, in accordance with an embodiment of the present approach.

FIG. 5 is a block diagram of the battery system 12 of FIG. 3 for a string 160 with multiple battery cells 62. Each of the battery cells 162 may be electrically coupled to corresponding monitoring circuitry 164. Each string 160 may include any suitable number of cells and corresponding monitoring circuitry. Each of the monitoring circuitry 164 may send signals to a controller 166 indicative of health of the corresponding battery cell. Further, the controller 166 may send signal(s) to control a bi-stable relay 168 based on the health of the battery cells 162, the health of the bus 170, or the like. As mentioned above, the controller 166 may be coupled to one or more other loads, such as a pre-charge circuit, a relay for an AC fan, or the like.

One or more of the disclosed embodiments, alone or on combination, may provide one or more technical effects including controlling a bi-stable relay to electrically connect battery cells to a bus. The bi-stable relay may receive a pulse that switches the bi-stable relay open or closed and the bi-stable relay may remain in the open or closed state after the pulse. A controller may receive power from a primary source. The controller may send a pulse to control the bi-stable relay using power provided by the primary source during operation. The controller may send the pulse to control the bi-stable relay using power provided by the battery cells while the primary source is not providing power. For example, the controller may use power from battery cells to electrically disconnect the battery cells from the bus to shut off operation of the battery cells, thereby isolating the battery cells from the bus. The controller may otherwise use power from the primary source to reduce imbalance of the battery cells from power drawn in controlling the bi-stable relay.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A control system for a battery module having one or more battery cells and having a first voltage, the control system comprising:
a bi-stable relay configured to electrically connect the battery module to a bus when a state of the bi-stable relay is in a first state, electrically disconnect the battery module from the bus when the state of the bi-stable relay is in a second state, and to remain in the first or second state until instructed to switch the state by a control signal; and
a controller coupled to the battery module, wherein the controller is configured to:
receive power from a primary source having a second voltage different from the first voltage;
be operatively coupled to the bi-stable relay and configured to send the control signal;
receive power from the battery module while the bi-stable relay is in the second state, wherein the battery module is disconnected from the bus; and
control operation of the bi-stable relay using power from the battery module in an event where the primary source does not provide power to the controller.

2. The control system of claim 1, wherein the controller is configured to: to control operation of the bi-stable relay using power from the primary source.

3. The control system of claim 2, wherein the controller is configured to detect whether the primary source is providing power.

4. The control system of claim 2, wherein the controller is configured to control the state of the bi-stable relay using power from the battery module during the event and to otherwise control the bi-stable relay via power from the primary source to reduce imbalance caused by drawing power from the battery module.

5. The control system of claim 4, wherein the controller is configured to draw power from the battery module to open the bi-stable relay and to shut down operation of the battery module.

6. The control system of claim 2, wherein the primary source comprises a low voltage source and the battery module provide power at a higher voltage than the low voltage source.

7. The control system of claim 6, wherein the event comprises a fault on a high voltage side having the battery module, the low voltage side having the primary source, or any combination thereof.

8. The control system of claim 6, wherein the controller is configured to send a pre-charge signal to close the pre-charge circuit to allow the bi-stable relay to close.

9. The control system of claim 1, comprising a second bi-stable relay electrically connected between the bus and a second end of the battery module, wherein the controller is configured to send an at least one other control signal indicative of instructions to control a state of the second bi-stable relay.

10. The control system of claim 1, wherein the controller is configured to receive power from a stationary source at a voltage lower than the battery module.

11. The control system of claim 1, wherein the controller receives a signal indicative of a fault condition from an at least one other controller.

12. The control system of claim 1, wherein the controller is configured to store an indication of the state in memory of the controller and to update the indication of the state upon switching the state of the bi-stable relay.

13. A non-transitory computer-readable medium comprising instructions configured to be executed by a controller operatively coupled to a bi-stable relay on a string between a first side and a second side of a bus, the instructions comprising instructions to:
receive, via the controller, power from a primary source having a first voltage;
receive, via the controller, power from a battery module on the string, the battery module having a second voltage different from the first voltage;
control, via the controller, operation of the bi-stable relay using power from the primary source to electrically connect or electrically disconnect the one or more battery cells; and
control, via the controller, operation of the bi-stable relay using power from the battery module in an event where the primary source does not provide power by:
electronically disconnecting, via the controller, the one or more battery cells from the bus in the event where the one or more battery cells provides power to the controller; and
receiving power, at the controller, from the battery module while the battery module is electronically disconnected from the bus.

14. The non-transitory computer-readable medium of claim 13, wherein the instructions comprise instructions to receive a first signal indicative of a fault condition and disconnecting the battery module in the event of the fault condition using power from the battery module.

15. The non-transitory computer-readable medium of claim 13, wherein the instructions comprise instructions to update an indication of a state of the bi-stable relay stored in memory of the controller.

16. The non-transitory computer-readable medium of claim 15, wherein the instructions comprise instructions to disconnect the bi-stable relay during the event where the primary source does not provide power.

17. The non-transitory computer-readable medium of claim 13, wherein the instructions comprise instructions to receive, via a sensor, a second signal indicative of the state of the bi-stable relay.

18. A power system comprising:
a first control system of a string including a battery module having a first voltage, the first control system comprising a first bi-stable relay and a first controller, wherein the first controller is configured to:
control a first state of the first bi-stable relay using power from the battery module during an event where a primary source, having a second voltage different from the first voltage, does not provide power to the first controller by:
disconnecting the string, including the battery module, from a bus in the event where the battery module provides power to the first controller; and
receiving power from the battery module while the battery module is electronically disconnected from the bus; and
otherwise control the first bi-stable relay using power from the primary source to minimize imbalance caused by drawing power from the battery module.

19. The power system of claim 18, wherein the first bi-stable relay is positioned between the bus and the battery module on a first side of the string.

* * * * *